Jan. 27, 1959 — T. M. LONG — 2,870,603
FLOW CONTROLLING MECHANISM FOR REACTION TYPE MOTORS
Filed June 12, 1947 — 4 Sheets-Sheet 3
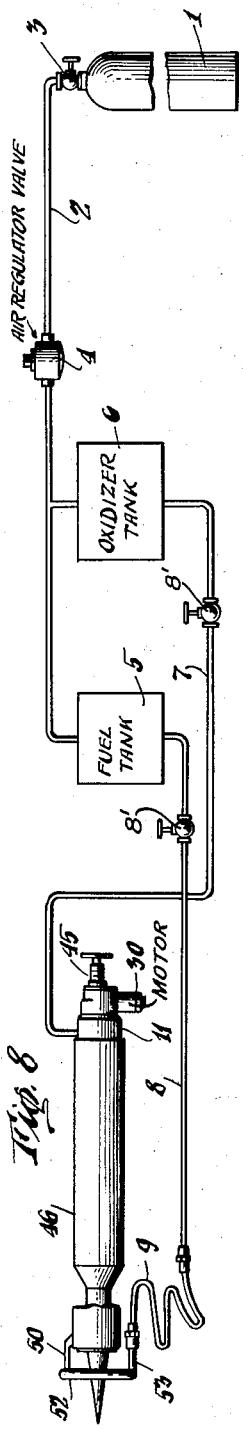
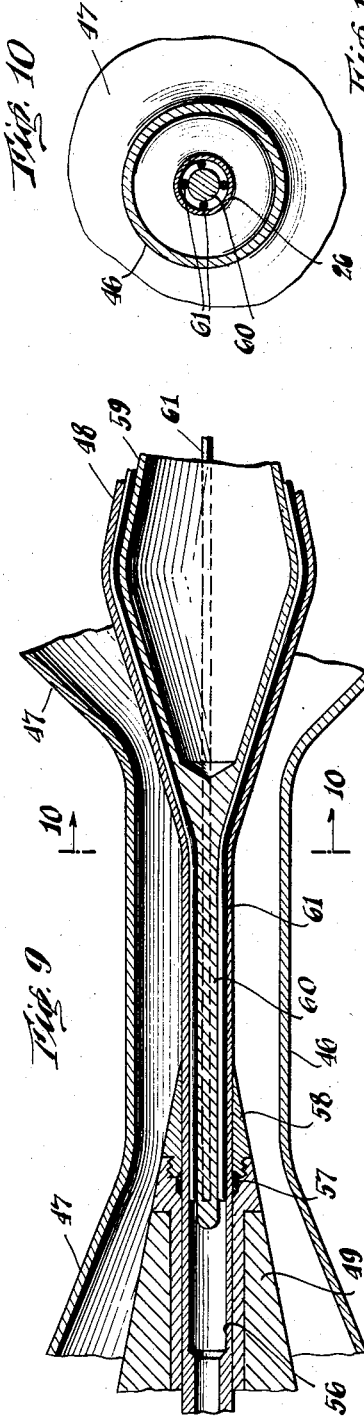
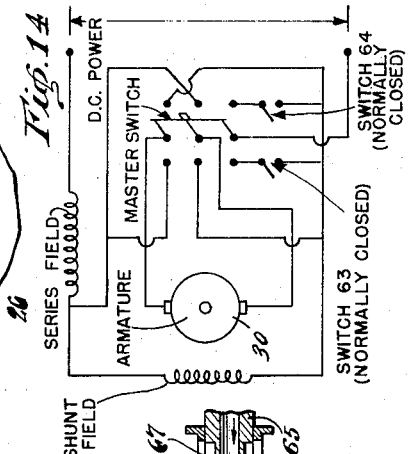
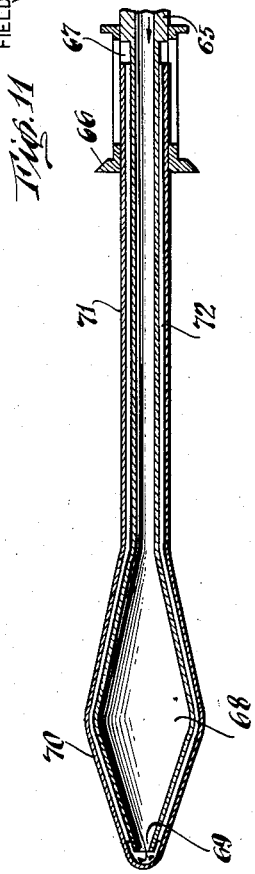
INVENTOR.
Theodore M. Long
BY Duell and Kane
ATTORNEYS Jan. 27, 1959 T. M. LONG 2,870,603
FLOW CONTROLLING MECHANISM FOR REACTION TYPE MOTORS
Filed June 12, 1947 4 Sheets-Sheet 4

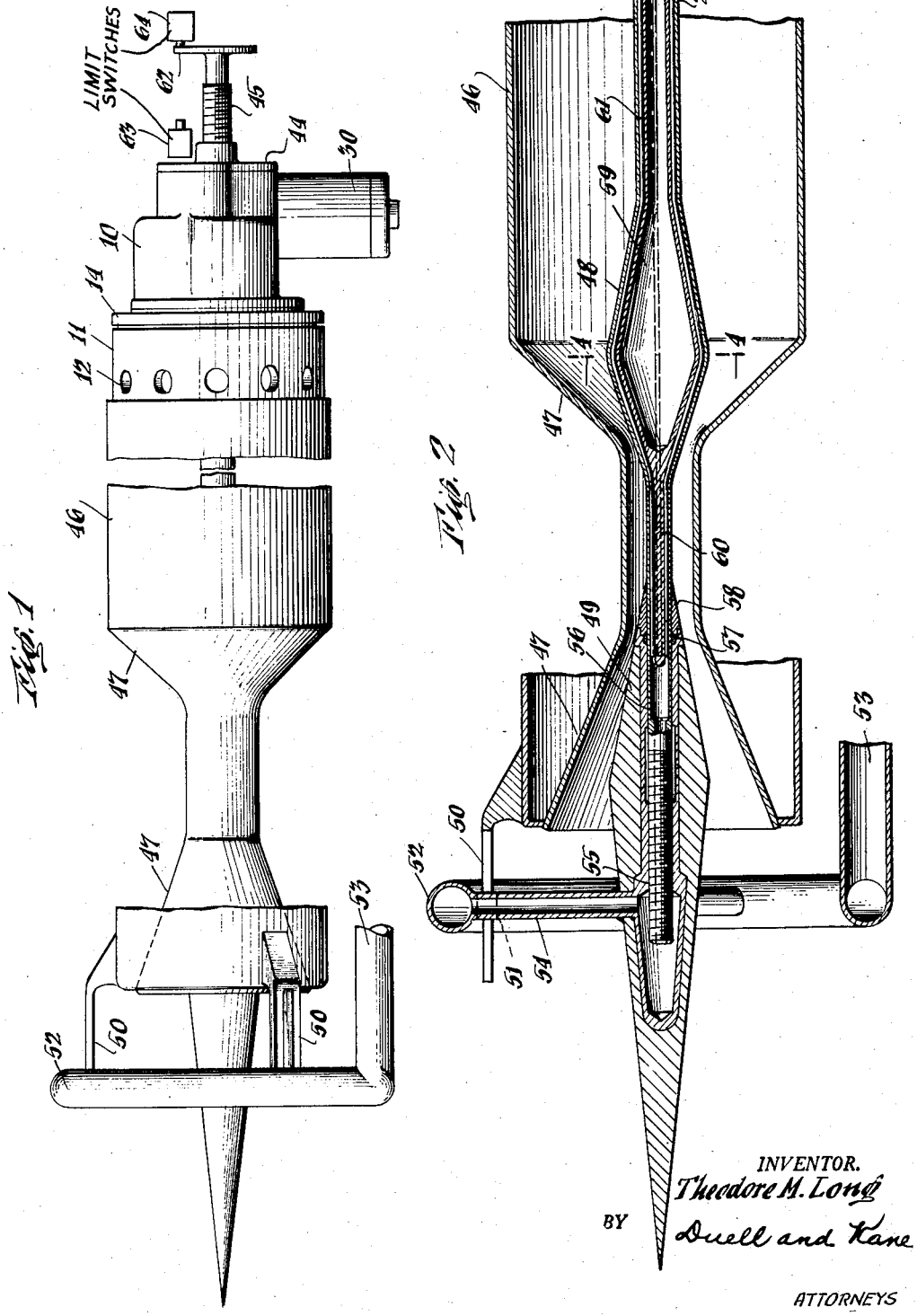

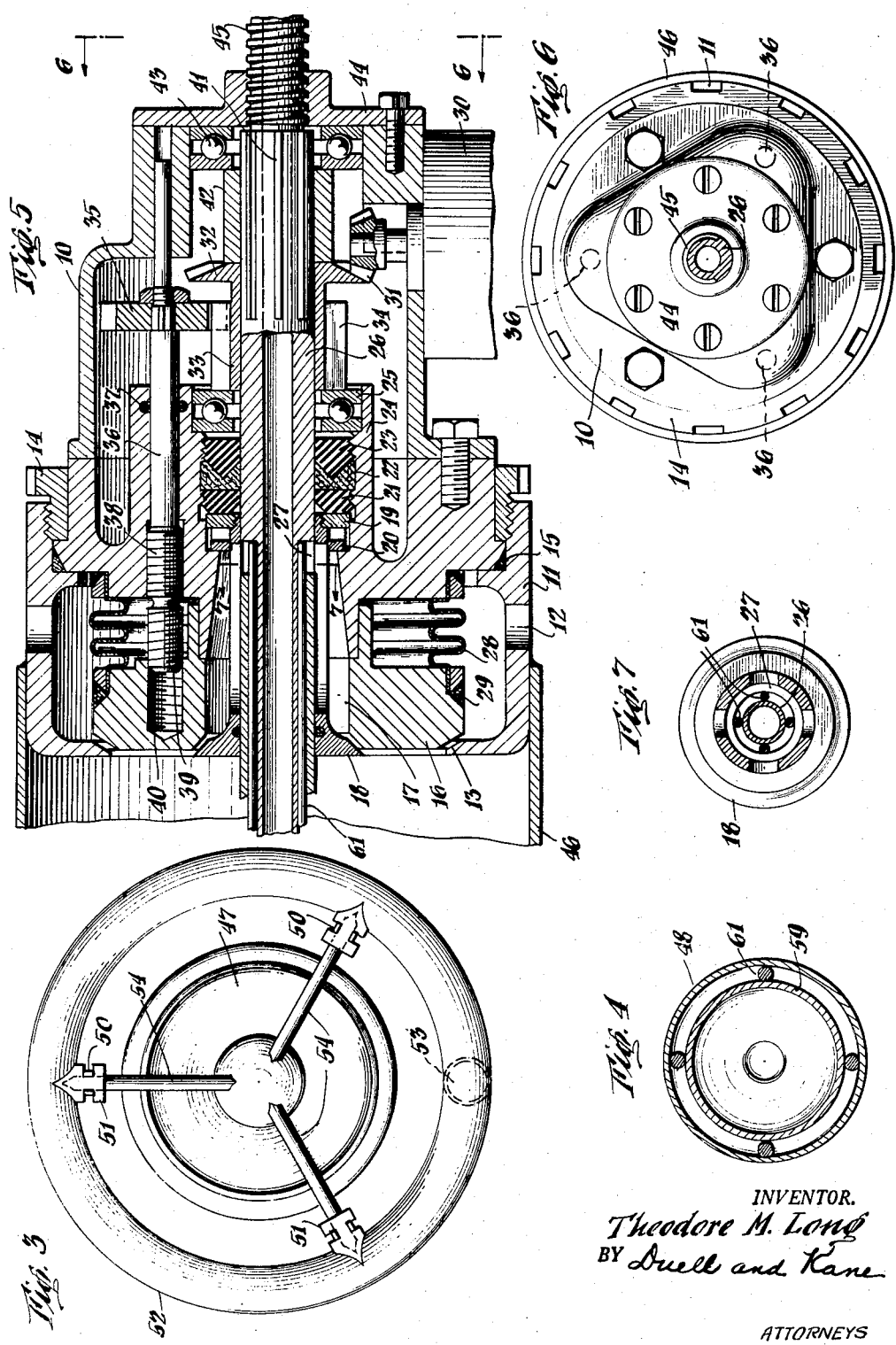

INVENTOR.
Theodore M. Long
BY Duell and Kane
ATTORNEYS

United States Patent Office 2,870,603
Patented Jan. 27, 1959

2,870,603

FLOW CONTROLLING MECHANISM FOR REACTION TYPE MOTORS

Theodore M. Long, Somerville, N. J.

Application June 12, 1947, Serial No. 754,133

20 Claims. (Cl. 60—35.6)

This invention relates to a structurally and functionally improved flow controlling mechanism and in its more specific aspects aims to provide a unit embracing a variable area orifice injector which may be used in numerous different associations.

Such associations may, for example, be the mixing of liquids, gases, powdered solids or suspensions in chemical processes when mixing and/or fine atomization are necessary. Additionally, the unit may in certain instances be employed advantageously in connection with combustion chambers such as those of gas turbines, jet engines and internal combustion engines. However, in certain respects the present controller is primarily intended for employment with a rocket motor in which connection it will—in the following specification—be described.

Therefore, it will be understood that this description is to be taken in an illustrative rather than a limiting sense except where the annexed claims indicate a contrary conclusion.

Thus, it is a primary object of the invention to provide a controlling structure in association with or forming a part of a liquid rocket motor injector and which structure will be capable of throttling the rocket motor at constant inlet pressures by varying the areas of the injection orifices and the nozzle area ratios, while at the same time, maintaining a definite relationship between the throttling produced by each. Accordingly, optimum value of the design characteristics will be obtained by maintaining a substantially constant chamber pressure.

A further object is that of providing in a rocket motor a desired relationship between the oxidizer injection rate, the fuel injection rate and the nozzle area ratios.

Another object is that of furnishing a controller in which the parts may be adjusted so that the ratio between the fuel and oxidizer injection rates may be varied with respect to the nozzle area ratios and each other. Accordingly, a functioning of the motor occurs under conditions of maximum efficiency.

A still further object is that of providing a control for governing the mixing of, for example, an oxidizer and fuel and in which the areas of both the converging and the diverging sections of the nozzle may be maintained under substantially constant contraction and expansion rates. Thus, the variation in area is made in a different relationship with the areas of the injection orifices to produce a high jet velocity and chamber pressure at a low thrust output. In a different relation, the nozzle expansion ratios may be altered in another manner so as to maintain efficiency with variation in altitude, thrust, or both.

Still another object is that of providing a structure of this type and in which, for example, a simple switch assembly permits of complete control of the rocket motor consistent with any given inlet pressure.

An additional object is that of furnishing a mechanism of this character which will embody relatively few parts, each individually simple and rugged in construction, these parts operating over long periods of time with freedom from all difficulties.

With these and other objects in mind, reference is had to the attached sheets of drawings illustrating practical embodiments of the invention, and in which:

Fig. 1 is a partly fragmentary side elevation of a motor mechanism for a rocket and including the present controller structure;

Fig. 2 is a sectional side view of certain of the parts as illustrated in Fig. 1 but showing the same in a different position;

Fig. 3 is a rear elevation of the apparatus as shown in Figs. 1 and 2;

Fig. 4 is a transverse sectional view taken along lines 4—4 as indicated in Fig. 2;

Fig. 5 is a sectional side view of one form of the controller mechanism;

Fig. 6 is an end view taken along lines 6—6 and in the direction of the arrows as indicated in Fig. 5;

Fig. 7 is a transverse sectional view taken along lines 7—7 and in the direction of the arrows as indicated in Fig. 5;

Fig. 8 is a view schematically illustrating a layout of apparatus such as may be employed in a rocket installation;

Fig. 9 is a somewhat enlarged fragmentary sectional side view of certain of the parts as shown especially in Fig. 2;

Fig. 10 is a transverse sectional view taken along lines 10—10 and in the direction of the arrows as indicated in Fig. 9;

Fig. 11 is a view of a layout of mechanism as generally shown in Fig. 2 but embracing no diverging restrictor structure;

Fig. 14 is a view schematically showing a circuit of an electric motor which may operate the mechanism.

Figure 12:
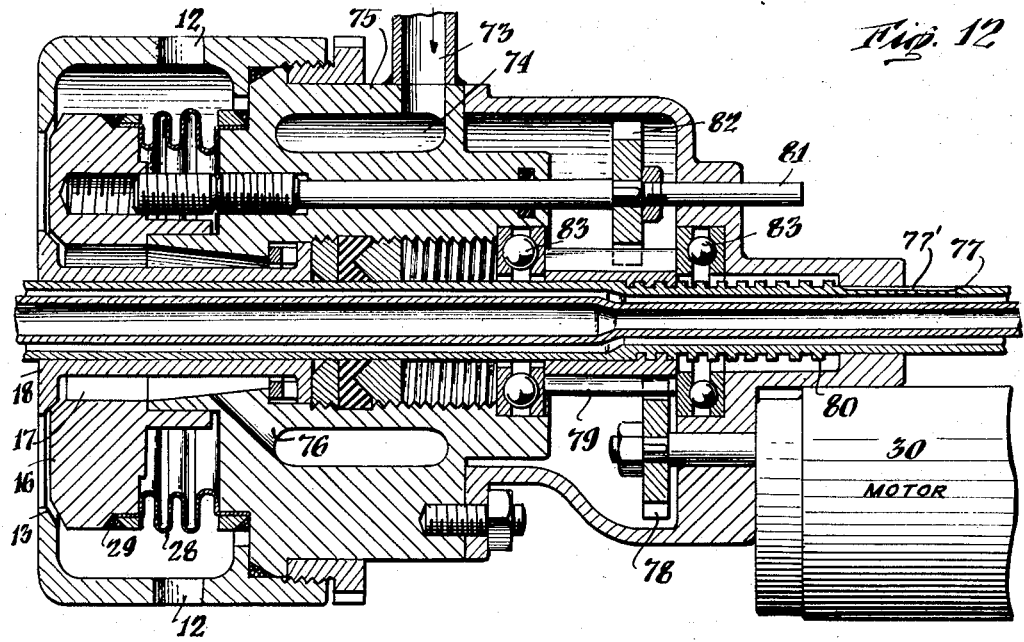
Fig. 12 is a sectional side view similar to Fig. 5 but showing a structure which may be employed if separate cooling is to be utilized.

Referring primarily to a general layout of parts such as is illustrated in Fig. 8, it will be seen that the reference numeral 1 indicates an air-supply flask from which a line 2 may extend. Within this line a manually controllable valve 3 may be interposed as may also an air-regulator valve 4. Beyond this point, branches may connect line 2 with a fuel tank 5 and an oxidizer tank 6 from which lines 7 and 8 lead towards the control mechanism. As shown, valves 8' may be interposed in both the oxidizer line 7 and fuel tank line 8. These valves would be the main propellant valves. Ordinarily, they would only be capable of being thrown to provide either fully opened or closed positions. The propellant-controlling valves may be operated in any desired manner. The line 8 may terminate in a flexible portion or coupling 9, the purpose of which will be hereinafter described.

As will be understood by those conversant with the art, the flask 1 may, for example, be charged to provide a source of air supply at 2,000 pounds per square inch. The regulator valve 4 may, for example, reduce this pressure to 500 pounds. The line 2 being connected to tanks 5 and 6, the air under pressure will serve to expel fuel and oxidizer from these tanks into the lines 7 and 8. With the valves in such latter lines open, the fuel and oxidizer will flow under pressure to the controller and injector mechanism as hereinafter described. It should be borne in mind that the foregoing illustrates merely one form of structure with which controllers constructed in accordance with the present teachings may be connected.

Now referring to the detailed structures of the controllers or injectors, it is primarily to be understood that in the following description certain passages will be referred to as providing paths for the flow of oxidizer. Others will provide paths for the flow of fuel. In most instances, the reverse might be true. Therefore, these passages are to be considered as interchangeable. Also, only in one of the forms herein illustrated has there been included a structure providing for cooling of the injector mechanism, per se. As will again be understood by those skilled in the art, suitable cooling passages might be includid in any of the structures hereinafter described.

Thus, referring to Fig. 5 in which one form of controller has been illustrated, it will be seen that the numeral 10 indicates a casing which may be made of any suitable number of parts, properly coupled to each other in any desired manner. The rear portion 11 of this casing is formed with openings 12 conveniently disposed in an annular series and through which the oxidizer will flow in a manner hereinafter brought out. The rear wall of the casing portion 11 presents an opening conveniently defined by a surface 13 which provides a valve seat. A retainer 14 may conveniently secure the casing portions 10 and 11 against separation and packing such as indicated at 15 may be provided to prevent undesired escape of fluids at this or other points within the mechanism.

Disposed within the casing portion 11 is a valve 16. This valve is cooperable with the seat 13 and is provided with a central bore 17. Controlling the flow of fluids through the bore 17 is an inner valve seat 18. This seat is in the form of a head from which a shank portion extends in an axial direction. The shank portion mounts a retainer 19 against which a spring 20 acts. A stop 21 limits movement of the shank and seat portion 18 to the right as in Fig. 5. A packing 22 may be disposed beyond the stop 21 and beyond which a retainer 23 is disposed.

A body 24 may enclose the several parts of this assembly as well as a thrust bearing 25 disposed beyond that assembly. Enclosed by the shank of the inner valve seat 18 and extending through the several parts disposed adjacent the inner end of the same is a restrictor rod and drive screw assembly or member 26. As shown, this member is formed with a bore for the passage of fuel and with ports 27. It is interrupted, as in Fig. 7, to permit of fluid flow from its bore through these ports. While the ports 27 may involve any desired construction, they are preferably in the form (as shown) of a peripheral slot cut in the outer wall of the restrictor rod and drive screw assembly. Thus, the port or opening will cover a full 360° of the restrictor rod. Therefore, as the rod rotates within the inner valve seat 18 (which is stationary) the port area will not be momentarily closed so as to partially restrict the fluid transfer. In this connection it is apparent that partial or momentary closure would occur during part of the rotation if any of the outer walls of the rod were left at this zone. Accordingly, fuel may flow from the bore of member 26 into the space between the inner valve seat 18 and the valve 16. An escape of fuel from this space other than past the seat 18 is prevented by an enveloping member 28 which may be in the form of a bellows seal; suitable packings 29 securing the ends of the seal or enveloping element in fluid tight relationship with respect to adjacent parts.

A movement of the parts with respect to each other is conveniently effected by employing a motor 30. The latter serves to actuate a drive gear 31, the teeth of which mesh with a gear 32 having a rearwardly extending sleeve 33. This sleeve has radially extending teeth 34 formed on its outer face and which are engaged by the teeth of, for example, three gears 35. These gears are secured against rotation one with respect to each of differential screw shafts 36 which may be engaged by packings 37 to provide seals. The inner ends of the shafts 36 terminate in threaded portions 38 and 39. The threads of these different portions may, for example, both be right hand. However, their pitch is different. The threads of the left hand portion 39 may engage with correspondingly threaded sockets 40 formed in the inner face of valve 16. The right hand or inner thread portions 38 may engage with correspondingly threaded bores formed in the body 24. The rod 26 is conveniently formed with splines 41 upon which a spacer 42 is disposed. The inner end of this spacer engages a thrust bearing 43 beyond which is arranged a cap 44. This cap has a threaded bore engaged by the threads 45 of the rod 26.

At this time, the motions imparted to these elements of the mechanism should be considered. The amount of movement specified may, of course, be varied. However, a general relationship as indicated is preferably to be followed. Thus, valve 16 may, for example, have a total movement of .05 inch. The threads 45 may extend an overall distance providing an operative length of 1.25 inches. These threads may embrace twenty five operative convolutions. Therefore, if the rod 26 is revolved a corresponding number of times, it will have traveled in an axial direction 1.25 inches. Threads 39 embracing forty eight convolutions, provide for a movement of $$\frac{1.000}{48}$$

In other words, for each rotation a movement of .022 inch occurs. Threads 38 which conveniently include fifty operative convolutions provide for a movement of $$\frac{1.000}{50}$$

Therefore, for each turn, a travel of .020 inch occurs. The advance imparted by threads 39 with relation to the axial movement of rod 26 is .022. However, valve 16 will advance only .022 inch minus .020 inch. Therefore, for each turn valve 16 advances only a distance of .002 inch.

The stop member 21 is adjusted so that the seat 18 initially moves with the valve 16 as the parts shift to the right. However, this engagement of the parts may follow through only a distance of .0001 inch. Such travel may, under certain conditions, be in excess of the latter figure but movement in unison should not occur through too great a distance. After such movement has been completed, the seat 18 will remain stationary while valve 16 continues to travel. Therefore, with valve 16 moving a maximum distance of .050 inch, it follows that if the unison travel of 16 and 18 is .0001 inch that the maximum separation of these elements will be substantially .049 inch which may, of course, be less if the stop 21 is adjusted to provide a different result.

A casing 46 extends rearwardly from the outer valve seat member 11. Having in mind that the present apparatus is primarily intended as a controlling mechanism for use with a jet or rocket motor, this casing 46 is extended inwardly and outwardly to provide nozzle cones 47. Disposed adjacent the innermost of these cones and within the casing 46 is a converging restrictor 48. Disposed for proper cooperation with the outermost cone is a diverging restrictor 49. The casing may terminate in a plurality of restrictor guides 50 upon which followers 51 are mounted for slidable movement. These followers support a manifold 52 provided with an intake 53. The latter is connected to the flexible pipe of tube 9. The restrictor supporting arms 54 which are connected to the manifold are hollow so that fuel may flow from the manifold inwardly through the arms and through ports to the bore of the restrictor rod 26. As will be understood the rod designated at 26 is actually an assembly including both outer and inner members. This assembly is continued in the form of the diverging restrictor 48 and baffle 59.

The interior of the diverging restrictor 49 is threaded and engaged by the correspondingly threaded exterior of the rod assembly 26 as indicated at 55 in Fig. 2. Such threading is preferably of relatively high pitch. A restrictor insert 56 is disposed within the bore of the diverging restrictor and a restrictor seal 57 secured by a retainer 58 prevents an escape of fuel. A baffle 59 is disposed within the converging restrictor 48 and forms a part of the assembly 26 as afore described. The baffle may terminate in an extended portion 60 providing a guide, as in Figs. 2, 9 and 10. This portion will also function as a flow accelerating member. Guides 61 may be interposed between the restrictor annulus and the rod assembly 26 and be continued as parts interposed between the converging restrictor 48 and the baffle 59.

As afore brought out, the rod 26 in the example previously given moves a distance of 1.25 inches. Therefore the converging restrictor 48 and baffle 59 will have a corresponding movement. However, the threads 55 will provide for a movement on the part of the diverging restrictor 49 of one and one half inches or more in the opposite direction. It should be remembered, that the restrictors 48 and 49 always move in opposite directions. Therefore, if rod 26 is rotated 25 times, the converging restrictor 48 will be shifted the desired amount by the threads 45. Simultaneously, the threads 55 will shift the diverging restrictor 49 the required amount.

As indicated especially in Fig. 1, the inner end of the rod 26 may carry a limit switch plate 62. This may engage the normally closed limit switches 63 and 64 to open the same. These switches prevent the motor 30 from operating the parts beyond predetermined limits. That motor may be of any suitable type involving proper circuits and controls resulting in a desired functioning of the parts. As shown the predetermined limit under which 63 opens may be that in which the valve 16 (as in Fig. 5) is in the extreme left position as hereinafter described. The predetermined position under which switch 64 opens may be any one convenient to the operation of the mechanism. Within these limits and referring to Fig. 14, the master switch may be thrown to the left completing the circuit from a direct current power supply through limit switch 63. The polarity of the power supply and the connections of the interior parts of the motor, the armature, the shunt field and the series field are such that motor 30 operates the rod 26 in clockwise rotation to the left until the master switch is opened or until the limit switch 63 is opened by contact with limit switch plate 62. Similarly, closing the master switch to the right as in Fig. 14 will interchange the connections of the interior parts of the motor and complete the circuits through limit switch 64 causing the motor to rotate in a direction opposite to that afore described. This will have the result of operating the rod 26 in counterclockwise rotation to the right as in Fig. 1 until the master switch is open or until limit switch 64 is opened by contact of the limit switch plate 62. As will also be understood, the motor drive of the gear 31 could be supplanted by any other desired form of drive as could also the detailed transmission of power by the gear 32, the gears driven thereby, etc.

With valve 16 in an extreme left position as viewed in Fig. 5, it is apparent that this valve will engage seat 13 as well as seat 18. Under these circumstances, no oxidizer or fuel fluid will flow through the outlets. However, as the shafts 36 are rotated, valve 16 will be moved from its seat 13 to allow of a flow of oxidizer through ports 12 and so past the seat 13. In such initial movement of the ports, the head 18 of the second valve seat will move with the valve 16. This will be because of the spring 20. With the valve 16 continuing to move in the direction specified, it will—as afore brought out— unseat from the member 18. Consequently fuel may flow through the bores of the restrictors and drive rod 26 past the interrupted portion of that assembly and through the ports 27. As previously mentioned, an intermingling of the oxidizer and fuel will be prevented by the several packings and especially the bellows seal 28.

It will, of course, be understood that the fuel enters through the tubes 9 and 53, manifold 52 and the fuel inlet passages through the restrictor supports 54. After passing from these supports, the fuel flows through the interior of the restrictor insert 56 and then passes into the interior of the restrictor annulus where it is forced to flow evenly and with considerable velocity by means of the extension 60, the restrictor baffle 59 and guides 61. In this manner the fuel is used to cool the complete restrictor assembly. Thereafter, and as afore brought out, the fuel enters the fuel annulus.

As is apparent, the converging restrictor 48 controls the converging section of the nozzle. The diverging restrictor 49 controls the area of the diverging section of the nozzle. Restrictor 48 is connected by means of the rod 26 to move in the same direction as the valve 16. Restrictor 49 moves in an opposite direction, by virtue of the fact that it is maintained by the guides 50, the manifold 52 and incidental structures against rotation and because of the screw threads 55. Therefore, with the restrictors moving in an opposite direction, the fuel and oxidizer injection rates are reduced when the areas of the converging and diverging sections of the nozzle are reduced. When moved in an opposite direction, the injection rates and areas increase simultaneously. The two restrictors are so contoured that the ratio of the area of the converging section to the areas of the diverging section remain nearly constant when so desired. This will maintain nozzle and combustion efficiency over a large range of the thrust output. In another relationship between injection rates and restrictor configurations the parts may be specifically designed to increase efficiency at low thrusts at high altitudes.

In certain instances, it may not be necessary or desirable to use the diverging restrictor. Such an arrangement has been somewhat schematically illustrated in Fig. 11. In that view, the numeral 65 indicates the rod corresponding to the rod assembly 26 in the earlier views. The numeral 66 indicates the valve corresponding to valve 16. Adjacent structures have not been shown in this view in that it may be assumed that functionally they are duplicates of the mechanisms heretofore described. Ports 67 may be provided to furnish communication between the bore of the rod and the parts exterior thereto. Adjacent its rear end, this rod 65 or a continuation thereof terminates in a baffle portion 68 having a rear open end 69. Concentrically disposed with respect to this baffle is a converging restrictor 70, which together with its forward extension 71 is maintained in properly spaced condition by means of rods 72 or any desired alternative structure.

As will be apparent, fuel or oxidizer may flow in the manner indicated by the arrow through the bore of rod 65. This flow will continue through the diverging restrictor 68 and outwardly through the rear end of the same. Thereupon the flow will reverse through the space intervening the restrictor and baffle and will continue; the fluid escaping through the ports 67 or other desired outlet. As is apparent incident to such flow, a cooling of the parts will occur. As will also be apparent, the rod 65 may either be non-rotatably supported (as in the case of the rod hereinafter described in Fig. 12) or this rod may be rotatable.

In the form of construction shown in Fig. 12, a mechanism generally similar to that heretofore described in Fig. 5 has been shown. For this reason, similar reference numerals have been employed to designate corresponding parts wherever this has been practicable. However, as will primarily be noted with regards to this structure, a tube 73 may be coupled to a passage 74 formed in the body 75 of the unit. This passage will serve to provide a path of flow for the fuel such that it may pass through one or more passages 76 to the central bore 17. In this form of construction, it is feasible to provide for separate cooling for the restrictor or restrictors. To this end, a suitable cooling agent (other than the fuel or oxidizer) is introduced into the inner restrictor passage and may be allowed to escape by way of the outer restrictor passage.

More particularly, the rod assembly 77 will provide for these passages as shown in this figure. This assembly may be non-rotative and limited solely to an axial shifting. As will be apparent in this connection, the motor 30 may drive gear 78. The teeth of the latter engage the teeth of a gear 79. The latter gear is formed with a bore which is interiorly threaded to furnish in effect a nut. These threads engage with threads 80 on the rod assembly 77. Any suitable number of shafts 81 similar to shafts 36 may be employed and which mount gears 82 meshing with the teeth of gear 79. Suitable bearings 83 may also be provided to absorb the thrust strains which are present.

As will be obvious, a rotation of the gear 78 will cause a corresponding movement on the part of gear 79. Assuming that the rod assembly 77 is maintained against rotation (by for example, a spline 77'), then it is apparent that the rotation of gear 79 will cause the rod assembly to be shifted axially. With such shifting, the restrictor may be correspondingly moved. Also, the shafts 81 will be simultaneously rotated to assure an operation of the valve 16 in a manner heretofore described.

Figure 13:
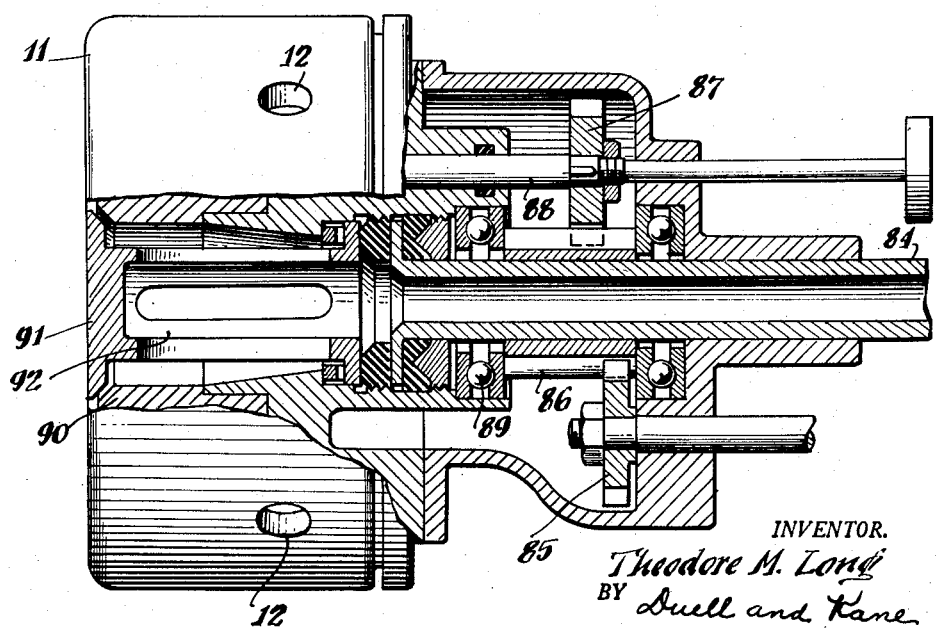
Fig. 13 shows an arrangement of parts embracing the injector and controls therefor but in which no associated restrictor is employed.

Finally, there has been shown in Fig. 13 a relatively very simple embodiment of structure designed in accordance with the teachings of the present invention. In that view, a tubular member 84 is substituted for the rod assemblies heretofore described. In any suitable manner, gear 85 may be driven. This will serve to drive a gear 86, the teeth of which engage with any proper number of gears 87. The latter are mounted on shafts 88 corresponding to the shafts 36 and 81. Bearings 89 may be provided as may also the heretofore described adjustable stop, spring, etc. for the valve 90 which corresponds to the valve 16. The seat member 91 may have the usual extended portion 92 and have the bore of such portion in communication with the bore of tube 84.

Thus, fluid will be free to flow through the tube of the latter bore and into the bore of extension 92. As the gear 85 is operated, gears 87 will be caused to rotate. This will drive shafts 88. Therefore, in a manner similar to that heretofore described, the valve 90 will be caused to seat and unseat both with respect to the body 11 as well as the member 91. Accordingly, flows of fluid as also heretofore described, will occur.

From the foregoing it will be understood that among others the several objects of the invention as specifically afore noted are achieved. Obviously numerous changes in construction and rearrangement of the parts may be resorted to without departing from the spirit of the invention as defined by the claims.

What I claim is:

1. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of seating engagement with its seats, the proportioning of said valve seat and further valve seat together with the establishment of desired pressure differentials in said fluids across said valve seat and further valve seat serving to meter the flow of oxidizer and fuel in desired ratio of one to the other when said bores are partially obstructed by said valve and the proportioning of said valve seat and further valve seat serving to inject and mingle the said fluids for combustion in said combustion chamber.

2. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for movably mounting said further valve seat, means for shifting said valve into and out of sealing engagement with the valve seat provided by said body and means for limiting the flow-restricting movement of said further valve seat.

3. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats and a flexible sealing member extending between said valve and body to prevent a mixing of the combustible propellents prior to their intermingling in the combustion chamber of the apparatus.

4. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for movably mounting said further valve seat, means for shifting said valve into and out of sealing engagement with the valve seat provided by said body, a spring for urging said further valve seat in a flow-interrupting direction and an adjustable stop for limiting such movement.

5. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats, a restrictor rod operating within said converging-diverging nozzle and a drive assembly connected to, movable with and extending beyond said further valve seat.

6. A flow controlling mechanism for reaction type motors having a combustion chamber, said structure including in combination a nozzle having converging-diverging sections, valve means governing the flows of fluid fuel and oxidizer, a restrictor having surfaces disposable adjacent and cooperative with the sections of said nozzle, said restrictor being connected to said valve means, common means for simultaneously shifting said valve means and restrictor, hollow supports connected to said restrictor, means coupled to said supports and providing a path for the flow of fluid fuels and guide means cooperable with said support to prevent rotation thereof and also prevent rotation of said restrictor while supporting said restrictor for axial movements within the sections of said converging-diverging nozzle to cause a variation in the area of the sections of said converging-diverging nozzle.

7. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, said valve being formed with screw threaded openings, a plurality of screw threaded rods extending into said openings and through openings in said body, said latter openings having their surfaces also threaded and pitched in a direction similar to but to a lesser degree than said screw threaded openings in said valve and means for rotating said rod to provide a differential screw action such that said valve will be moved into engagement with its seat to interrupt a flow of fluids through both of said bores.

8. A flow controlling mechanism for reaction type motors having a combustion chamber within which fluid propellants are to be burned, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seat thereof, a further body concentrically disposed with respect to said valve and also provided with a seat cooperable with a further surface of said valve, the propellants flowing past said seats towards said chamber, means for moving said valve with respect to said member and further body and flexible sealing means extending between said member and further body to prevent the mixing of the propellents flowing past said valve seats.

9. A flow controlling mechanism for reaction type motors having a combustion chamber, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seats thereof, a further body concentrically disposed with respect to said valve and also provided with a seat cooperable with a further surface of said valve, means for moving said valve with respect to said member and further body, a corrugated flexible seal element having its opposite edges secured to said body and valve respectively to prevent a mixing of combustible propellents flow respectively between said valve and further body and said valve and seat member.

10. A flow controlling mechanism for reaction type motors having a combustion chamber, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seat thereof, a further body concentrically dispoed with respect to said valve and also provided with a seat cooperable with a further surface of said valve, a flexible seal element extending between said body and said valve to prevent a mixing of fluids from the spaces intervening said valve and further body to the space intervening said valve and seat member and means for moving said valve and connected to the same within the space defined by said seal element.

11. A flow controlling mechanism for reaction type motors having a combustion chamber, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seat thereof, a body concentrically disposed with respect to said valve and also provided with a seat cooperable with a further surface of said valve, means for moving said valve with respect to said member and body, a restrictor rod and drive assembly extending through said valve seat member, means for shifting said assembly, means connecting said shifting means to simultaneously move said valve in synchronism therewith and a restrictor secured to said rod.

12. A flow controlling mechanism for reaction type motors having a combustion chamber, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seat thereof, a body concentrically disposed with respect to said valve and also provided with a seat cooperable with a further surface of said valve, means for moving said valve with respect to said member and body, said seat member being formed with a bore and with openings affording passage from said bore to the space intervening said member and valve and a tubular fluid-conducting member disposed in line with and communicating with said bore.

13. A flow controlling mechanism for reaction type motors having a combustion chamber, said mechanism including in combination a converging-diverging nozzle, a body in advance thereof and connected thereto, said body providing a valve seat member, means for movably supporting the same, a movably mounted valve concentrically disposed with respect to said member and formed with a surface cooperable with the seat thereof, a body concentrically disposed with respect to said valve and also provided with a seat cooperable with a further surface of said valve, means for moving said valve with respect to said member and body, a restrictor rod assembly formed with threads on its exterior face to operate within said converging-diverging nozzle, an interiorly threaded member engaging said threads and rotatable to shift said assembly in an axial direction and means for connecting said interiorly threaded member with said valve moving means to shift the same simultaneously with the movement of said latter means.

14. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid thereto, means for shifting said valve into and out of sealing engagement with its seats, a rotatable restrictor rod assembly projecting through said further valve seat to operate within said converging-diverging nozzle, the exterior of a portion of said assembly being threaded, a member fixed with respect to the body providing the first named valve seat and interiorly threaded to engage the threads of said assembly and means connected with said valve shifting means and with said assembly to simultaneously rotate the latter and shift said valve.

15. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats, a restrictor rod assembly connected to move simultaneously with the movements of said valve and converging and diverging restrictors connected to said rod; such interconnected restrictors being so proportioned as to meter the flow of gas produced by the combustion of oxidizer and fuel in said combustion chamber from the latter through said converging-diverging nozzle.

16. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats, a restrictor rod assembly connected to move simultaneously with the movements of said valve, converging and diverging restrictors connected to said rod and means interconnecting the parts whereby said restrictors are moved towards and away from each other within said converging-diverging nozzle as said rod is moved.

17. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats, a rod connected to move as said valve is moved, and a converging or diverging restrictor fixedly secured to said rod to operate within said converging-diverging nozzle.

18. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for the flow of fluid oxidizer and the other for the flow of fuel, a further valve seat cooperable with said valve for closing the bore of the latter against the flow of fluid therethrough, means for shifting said valve into and out of sealing engagement with its seats, a rod connected to move as said valve is moved, a converging or diverging restrictor secured to said rod, said restrictor and rod being hollow for the passage of fluid and a baffle member disposed within said restrictor.

19. A flow controlling mechanism for reaction type motors having a combustion chamber, said mechanism including in combination a converging-diverging nozzle, a body in advance thereof and connected thereto, said body providing a valve seat, a valve movable with respect thereto and provided with a bore, said body being also provided with a bore, one of said bores serving as a passage for a flow of fluid oxidizer and the other for the flow of fuel, a further valve seat cooperable with said valve for closing the bore of the latter against the flow of fluid therethrough, means for shifting said valve into and out of sealing engagement with its seats, a rod connected to move as said valve is moved, a converging or diverging restrictor secured to said rod, to operate within said converging-diverging nozzle, said restrictor and rod being hollow for the passage of fluid, a baffle member disposed within said restrictor, said baffle being also hollow and provided with an open end communicating with the interior of said restrictor whereby fluid may flow through said baffle, restrictor and hollow rod.

20. A flow controlling mechanism for reaction type motors having a combustion chamber, said mechanism including in combination a converging-diverging nozzle, a body in advance thereof and connected thereto, said body providing a valve seat, a valve cooperable with said seat, means providing a second valve seat and flow controlling means cooperable therewith, means for shifting said valve and flow controlling means with respect to their seats, a tubular rotatable restrictor rod, means for connecting said rod with said valve shifting means whereby, as the latter operates, said rod is rotated, a restrictor, means for restraining the latter against rotation and screw threads between said restrictor and rod whereby as the latter is rotated said restrictor will be shifted.

References Cited in the file of this patent

UNITED STATES PATENTS

| | | |
|---|---|---|
| 633,415 | Batchelor | Sept. 19, 1899 |
| 1,013,640 | Bryon | Jan. 2, 1912 |
| 1,056,432 | McCloud | Mar. 18, 1913 |
| 1,463,370 | Mueller | July 31, 1923 |
| 1,556,227 | Lemétais | Oct. 6, 1925 |
| 1,707,541 | Roth | Apr. 2, 1929 |
| 1,732,097 | Lemétais | Oct. 15, 1929 |
| 1,975,635 | Dunham | Oct. 2, 1934 |
| 2,254,308 | Nicholas | Sept. 2, 1941 |
| 2,310,516 | Clark | Feb. 9, 1943 |
| 2,390,161 | Mercier | Dec. 4, 1945 |

FOREIGN PATENTS

| | | |
|---|---|---|
| 556,902 | Germany | Jan. 30, 1930 |

OTHER REFERENCES

Astronautics, issue of March 1944, pages 11–13.